A. H. MAÎTRE & V. H. G. MARTIN.
CONTACT BREAKER DEVICE FOR ELECTROMAGNETIC VIBRATING MEMBERS.
APPLICATION FILED MAR. 7, 1914.
1,190,244.
Patented July 4, 1916.
3 SHEETS—SHEET 1.
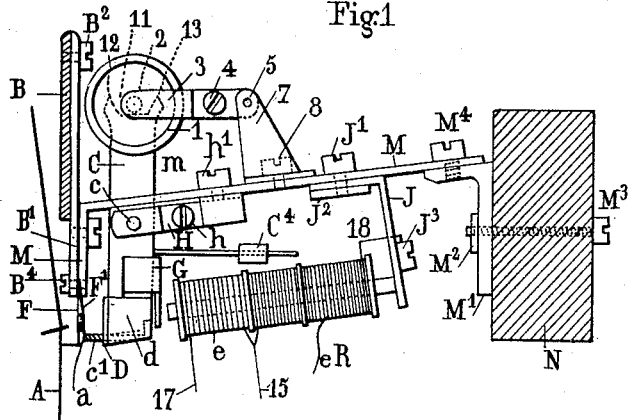
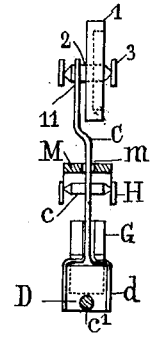
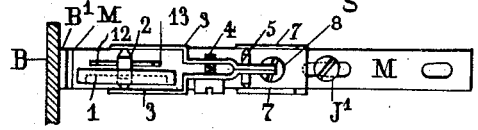
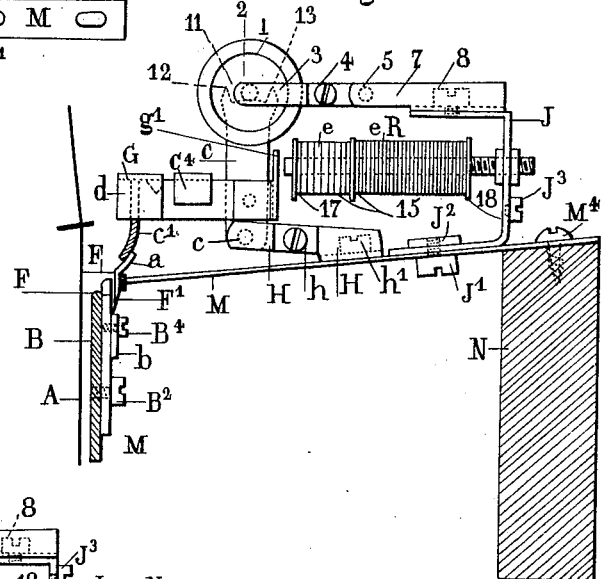
Inventors.
Alcide Hector Maître.
Victor Henri Gaston Martin
By Howson & Howson
Attys.

A. H. MAÎTRE & V. H. G. MARTIN.
CONTACT BREAKER DEVICE FOR ELECTROMAGNETIC VIBRATING MEMBERS.
APPLICATION FILED MAR. 7, 1914.
1,190,244.
Patented July 4, 1916.
3 SHEETS—SHEET 2.
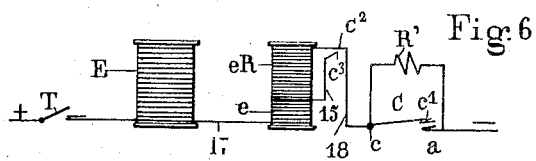
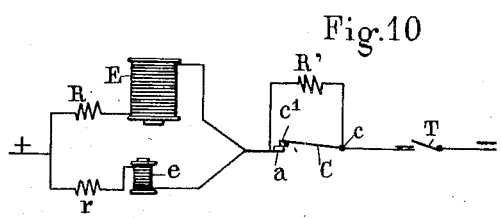
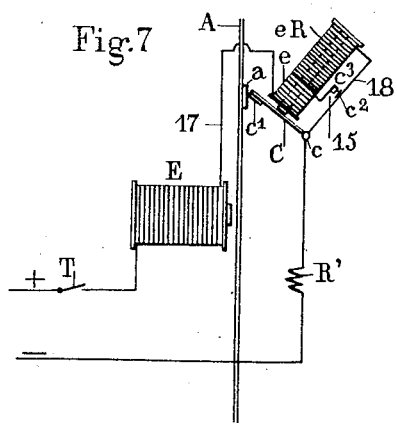
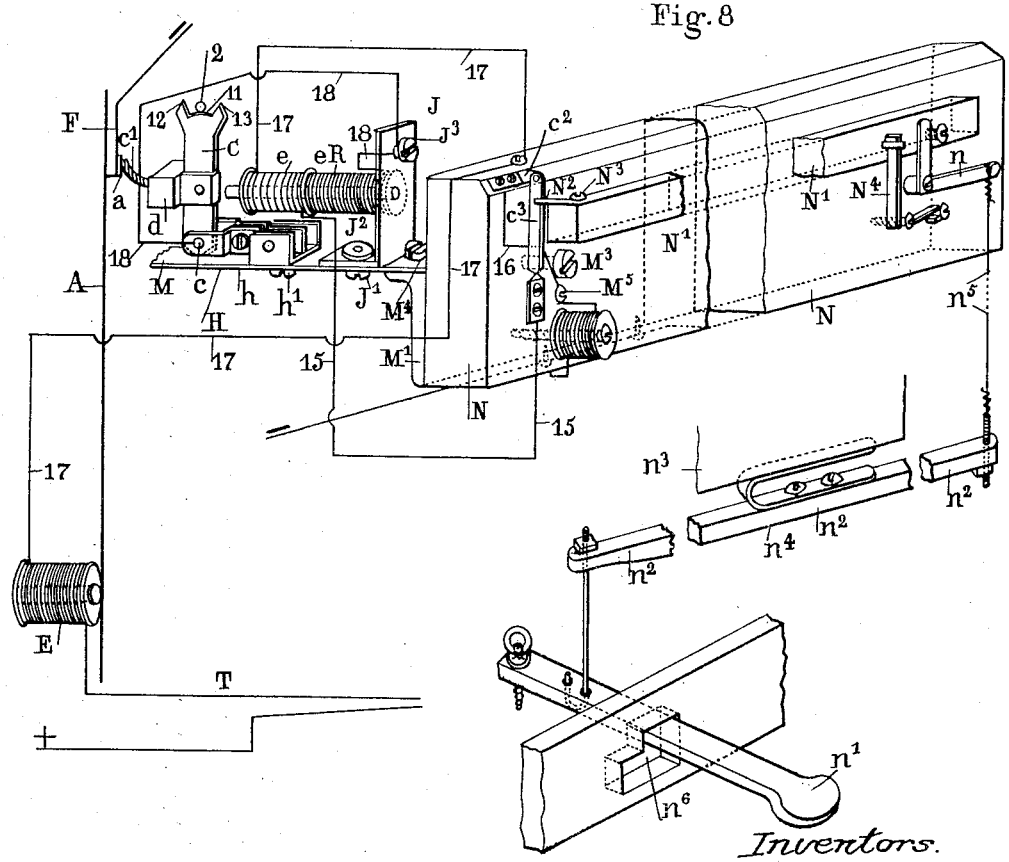
Inventors.
Alcide Hector Maître
Victor Henri Gaston Martin
By Howson & Howson
Attys.

A. H. MAITRE & V. H. G. MARTIN.
CONTACT BREAKER DEVICE FOR ELECTROMAGNETIC VIBRATING MEMBERS.
APPLICATION FILED MAR. 7, 1914.
1,190,244.
Patented July 4, 1916.
3 SHEETS—SHEET 3.
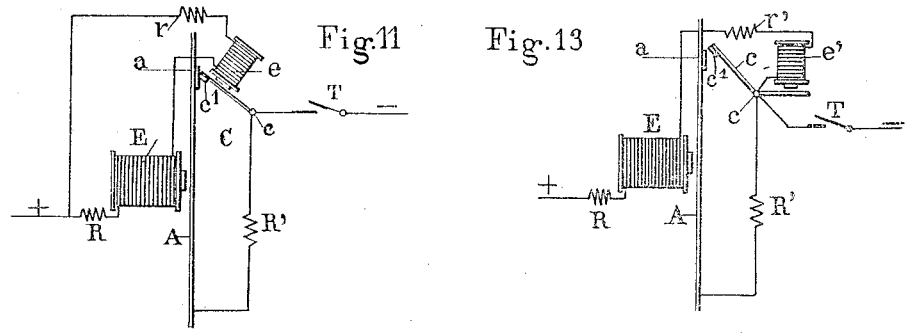
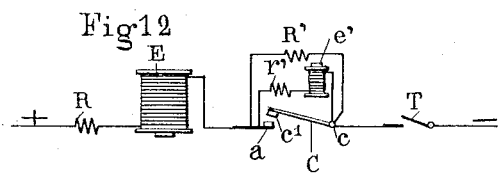
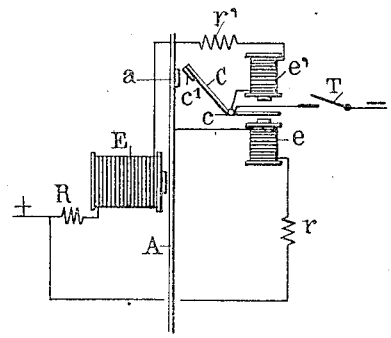
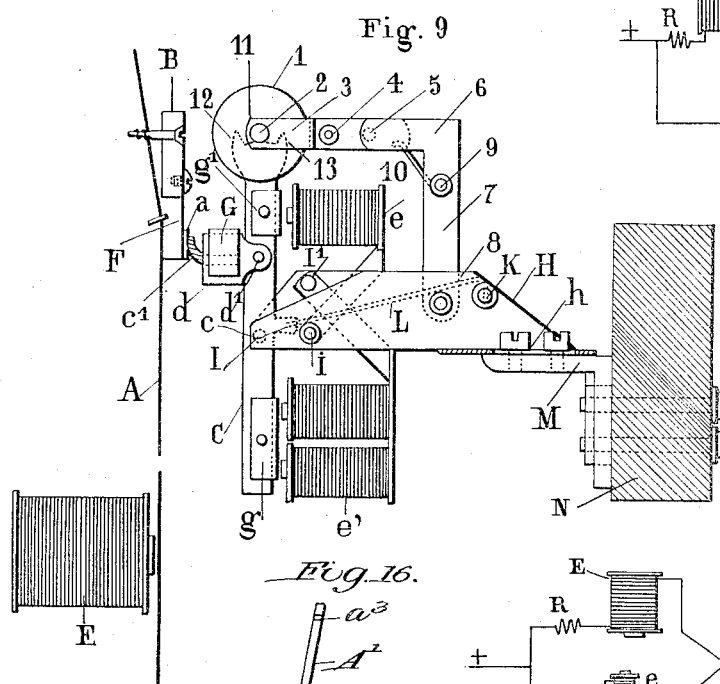
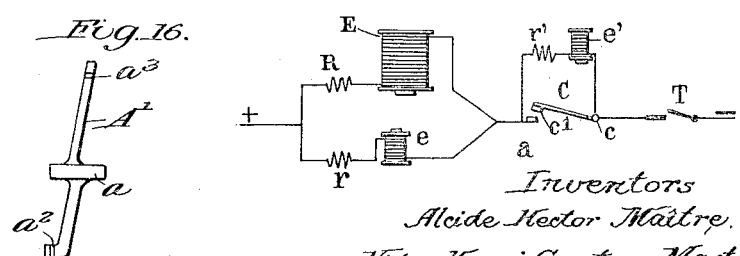
Inventors
Alcide Hector Maître,
Victor Henri Gaston Martin
By Howson & Howson
Attys

UNITED STATES PATENT OFFICE.

ALCIDE HECTOR MAÎTRE AND VICTOR HENRI GASTON MARTIN, OF ROUEN, FRANCE.

CONTACT-BREAKER DEVICE FOR ELECTROMAGNETIC VIBRATING MEMBERS.

1,190,244.  Specification of Letters Patent.  Patented July 4, 1916.

Application filed March 7, 1914. Serial No. 823,091.

*To all whom it may concern:*

Be it known that we, ALCIDE HECTOR MAÎTRE and VICTOR HENRI GASTON MARTIN, both of 42 Rue Damiette, Rouen, Seine Inférieure, France, have invented certain new and useful Improvements in Contact-Breaker Devices for Electromagnetic Vibrating Members, of which the following is a specification.

The present invention relates to contact-breaker devices intended to produce pulsations of current in the circuit of electromagnets employed for setting in vibration sonorous members, (gongs, piano-strings, etc.) These devices comprise as is known, a contact piece carried by a movable arm mounted on a pivot or on a spring in such a way as to be able to take up a vibration of small amplitude, which interrupts the current in the principal electromagnet or electromagnet vibrating the sonorous body, until the sonorous body has taken up an amplitude of vibration sufficient to become itself the interrupter device; see prior application No. 819,602, filed Feb. 18, 1914.

Figures 1 to 8 show a form of construction applied to the setting in vibration of a piano-string. Fig. 1 is an elevation of the device for a high or top note. Fig. 2 is an edge view of the movable arm of Fig. 1. Fig. 3 is a plan view of the upper part of Fig. 1. Fig. 4 is an elevation of the device for a middle or medium note. Fig. 5 is an elevation of the device for a low note. Fig. 6 represents diagrammatically the circuit for a note. Fig. 7 is a semi-diagrammatic representation of the same circuit. Fig. 8 is a perspective view of the arrangement for producing the pianissimo or soft-pedal effect. Fig. 9 represents a modification of the contact breaker device. Fig. 10 shows the diagram of connections of the electromagnet $e$, seen in Fig. 9. Fig. 11 is a semi-diagrammatic representation of the same connections. Fig. 12 represents the diagram of connections of the electromagnet $e^1$, seen in Fig. 9. Fig. 13 is a semi-diagrammatic representation of the same connections. Fig. 14 represents the diagram of connections of the two electromagnets $e$ and $e^1$ of Fig. 9, both actuating the movable arm. Fig. 15 is the semi-diagrammatic representation of the same connections. Fig. 16 is a front elevation of the lever $A^1$.

In Figs. 1 to 5 F is a spring carrying a non-oxidizing contact piece $a$ and pressing at its curved end upon the string A so as to cause the contact $a$ to vibrate with this string. $F^1$ is an opposing spring pressing against the spring F through a pad of soft material such as piece of felt or rubber. The springs F and $F^1$ are firmly clamped between the supports $B^1$ and M (Fig. 1) or $b$ and M (Figs. 4 and 5) and are therefore adjustable. $c^1$ is a non-oxidizing contact piece formed preferably of a bundle of fine wires conveniently twisted and fitted in a soft material such as rubber as D, itself gripped between the two arms of a fork $d$ screwed upon the movable arm C; a small piece of sheet metal G bent to U-shape holds together the arms of the fork $d$. One end of the flexible wire $c^1$ bears upon the contact piece $a$; the other end of the wire $c^1$ is folded between the rubber and one of the arms of the fork $d$ so as to establish the electrical connection $c^1$ with the movable arm C and therefore with the support M. H is a forked copper arm, between the arms of which the shaft $c$ is pivoted; the separation of the arms is regulated by the screw $h$ and the fork is fixed in an adjustable manner upon the support M by means of the screw $h^1$. A counter weight $C^4$ presses the contact $c^1$ against the contact $a$ to insure a good electrical connection therethrough. $e$ and $e$ R are two electromagnets mounted in series in the circuit of the main electromagnet E actuating the string A (see also Figs. 6 and 7). These electromagnets are carried by an adjustable stirrup J held between the screw $J^1$ and its nut $J^2$. The supports M are connected on one hand to the rod N by the adjustable stirrup $M^1$ and on the other to the transverse rod B by the screw $B^2$ which allows the regulation of the height.

In Figs. 6 and 7, A is the piano string, E the electromagnet for vibrating the same, C the arm movable around the shaft $c$, $a$ and $c^1$ two non-oxidizing contact pieces, $R^1$ a resistance placed across the break to prevent sparks due to the extra current or self-induction, T a pair of contacts placed under the keys of the keyboard; $e$ and $e$ R are two electromagnets placed in series in the circuit of the main electromagnet E to actuate the movable arm C.

The operation is as follows:—When the circuit is closed at T (Figs. 6, 7 and 8) the current passes through the electro-magnet E (Figs. 7, 8 and 9), electromagnet $e$, $e$ R, wire 18, spindle $c$, pivoted arm C, contact $c^1$ and contact $a$ to its source. During its passage, the electro-magnet E attracts the wire A and the electro-magnet $e$ R attracts the pivoted arm C and thus breaks the contacts between $c^1$ and $a$. The current is thus interrupted and the wire A and armature G (Figs. 1 and 4), or $g^1$ (Fig. 5) are suddenly freed; the wire A vibrates, the counterweights $C^4$ compress the contact $c^1$ upon the contact $a$ and the same phenomena tend to repeat themselves; but as a consequence of the vibration of the contact $a$ its engagement with $c^1$ is interrupted and a condition is established in which the interruptions of the current are synchronous with the vibration of the wire A.

In order to obtain a sound of greater volume and in order that this sound may be established as promptly as possible, it is necessary that the interruptions of contact between $c^1$ and $a$ shall be produced exclusively by the wire A. It is necessary therefore to reduce as far as possible the amplitude of the oscillations of the mobile contact piece $c^1$. To this end a disk 1 is mounted on a spindle 2 supported in the arms of a clamping fork 3 the pressure of which upon the spindle may be regulated through a pinching screw 4 which may be furnished with a lock nut to insure its maintenance in adjusted position. The disk 1 and its spindle 2 are preferably cast integral in order that they may be perfectly concentric. The clamping fork 3 is itself pivoted on a spindle 5 in a second adjusted fork 7 clamped at 8 to the frame M. The upper end of the movable arm C terminates in an arc 11 the axis of which is the spindle $c$ on which the movable arm C is mounted. The disk 1 bears on this arc through its spindle 2 at a point vertically above the spindle C in order that there may be no variation in the pressure between the contacts $c^1$ and $a$. The pressure of the disk upon the arc 11 may be regulated by a counterweight or a spring. The function of the disk 1 is as follows:—
When the pivoted arm C is set in slow motion, for example, when after the separation of the contacts $c^1$ and $a$ the pivoted arm C is freed and subjected to the returning action of the switch spring, the disk 1 rolls on the arc 11 and $c^1$ returns gently into contact with $a$. But if the movement of the pivoted arm is repeated, for example, when this is drawn by the electro-magnet $e$, $e$ R or is drawn back by the vibration of the wire there is not time for the rolling action of the disk to take place, inasmuch as the inertia of the disk prevents it. Therefore the spindle 2 slides on the arc 11 and is frictioned therewith, damps the oscillations of the pivoted arm C. The disk 1 thus acts as a true brake. Two lugs 12 and 13 prevent the disk from escaping from the end of the arm and limit the extent of the motion of the latter.

The electro-magnets $e$, $e$ R are wound in the same direction on a core of soft iron in order to emphasize their action. The resistance of the electro-magnet $e$ R is sufficient to produce the desired pianissimo effect either by terminating the winding with a resistance wire or connecting it to a supplemental resistance.

$c^2$, $c^3$ are the two non-oxidizing contacts, the separation of which introduces the electro-magnet $e$ R into the circuit thus securing the pianissimo effect, while when they are in contact the electro-magnet $e$ R is short circuited thus giving the forte effect. On the other hand, the number of turns or coils on $e$ R is such that the combined effect of the electromagnets $e$ and $e$ R during the pianissimo action is the same as the effect of the single electromagnet $e$ during a forte action. In this way the activity of the interrupting electromagnet does not change when the intensity of the sound is varied.

Fig. 9 represents the placing of the contact breaker and the mechanism producing the pianissimo action.

The electrical circuit corresponding to Figs. 6 and 7 is shown diagrammatically in thin lines. The bar N carries at front the contacts $c^2$ $c^3$; one of them ($c^3$) is connected by the wire 15 to the junction of the electromagnets $e$ and $e$ R (see also Figs. 6 and 7); the other ($c^2$) is electrically connected to the frame M by means of the stirrup $M^1$, the screws $M^3$ and $M^5$ connected together, and the wire 16. When the spring $c^3$ is free, it bears on $c^2$ and places $e$ R on short circuit. This produces the forte action. When on the contrary, $c^3$ is separated from $c^2$ by the wire $N^2$, $e$ R is in the circuit, which produces the pianissimo effect. The wires $N^2$ are fixed by screws $N^3$ upon a rod $N^1$ movable from right to left, so that all the contacts $c^3$ $c^2$ are separated simultaneously. It is evident that the pianissimo effect can thus be produced on each half of the piano or on the whole key board if the two halves are connected. It is also evident that it would be possible to produce several successive pianissimo effects by means of several coils such as $e$ R provided each with a pair of contacts like $c^2$ and $c^3$, and that in this case, in order not to affect the sharpness of action of the main electromagnet and the interrupter electromagnet, the resistance R' might have been increased parallel-wise to that of $e$ R.

Fig. 10 shows a modification of the contact breaker device just described; this modification allows of diminishing the intensity of the sound without affecting the activity of the interrupter-electromagnet $e$, while however increasing the resistance of the circuit in order to economize electrical energy. The same letters of reference designate the same parts as in Figs. 1 to 5. H is a forked arm carrying all the parts of the contact breaker and adjustably screwed upon the stirrup M; the shaft $c$ of the movable arm is pivoted on centers between the arms of the fork H. The feet of the magnets $e$ and $e^1$ are riveted stiffly upon the faces of the fork at I and $I^1$; in the same way the foot 7 is riveted adjustably at 8. L is a spring for regulating the pressure between the contacts $c$ $a$; it is coiled around an adjustable distance-piece K riveted between the cheeks of the fork H. 10 is a spring to allow of regulating the pressure of the flywheel I upon the circular arc 11 of the movable arm C. The electromagnet $e$ operates during the engagement of the contacts $c^1$ $a$ and acts by attraction as in the previous examples, but it is connected in an electric circuit independent of that of the main electromagnet E operating the string, and this method of connection serves to render its activity independent of that of the magnet E.

Fig. 11 represents the diagram of connections for one note, and Fig. 12 the semi-diagram of the same connections. R is a rheostat inserted in the circuit of E for the purpose of varying the intensity of the sound at will; $r$ is a fixed resistance added to $e$ in order to regulate once for all its activity. It is to be noted that the electromagnet $e^1$ does not enter into these connections. On the other hand, in the following connections (shown in Figs. 13 and 14), the electromagnet $e^1$ alone is used. $e^1$ is an electromagnet mounted across the break of the contacts $c^1$ $a$, operating during their break, and acting by bringing together the contacts $c^1$ $a$. In this case the spring L must be regulated so that normally it separates the contacts $c^1$ $a$. When the circuit is closed at T the electro-magnet $e^1$ draw the contact $c^1$ into engagement with the contact $a$, whereupon the current passes into electromagnet E and attracts the wire A, but ceases to pass into electro-magnets $e^1$ thereby freeing the armature $g$ with the result that the contacts $c^1$ and $a$ are again separated; the attraction ceases almost completely in E because the resistance of $e^1$ is much greater than that of E. The wire is suddenly freed and starts vibrating, whereupon the current again enters the electromagnets $e^1$ resulting in the engagement of the contacts $c^1$ and $a$ and the phenomena repeat themselves until the wire A is sufficiently vibrated to act as an auto interrupter. The electromagnet $e^1$ having a high resistance and possessing self-induction does not interfere with the working of the main electromagnet E; on the other hand, the resistance of $e^1$ being much greater than that of E, the activity of $e^1$ is only slightly diminished by the interposition of the resistance R in the circuit, and the pressure of the contacts $c^1$ $a$ remains sufficient to insure satisfactory working.

Fig. 13 represents the diagram of connections of the electromagnet $e^1$ in the circuit of a note, and Fig. 14 the semi-diagram of the same connections. $R^1$ is in all cases a resistance to prevent sparking; the electromagnet $e^1$ does not wholly replace it, because it possesses self-induction. $r^1$ is a fixed resistance regulating once for all the activity of $e^1$; R is a rheostat which allows of varying at will the intensity of the sound. In the preceding arrangements, the electromagnets $e$ and $e^1$ are inserted separately. In the following, on the contrary, they are both inserted alternately and in opposite sense; the whole may thus be regulated so that normally there exists neither pressure nor clearance between the contact pieces $c^1$ $a$.

Fig. 15 represents the diagram of this double arrangement for one note, and Fig. 16 the semi-diagram of the same arrangement. The same letters designate the same parts as in Figs. 11 to 14.

Having now particularly described and ascertained the nature of our said invention and in what manner the same is to be performed, we declare that what we claim is:—

1. In an electric circuit, an electromagnet energized by said circuit, a vibratory body subjected to the influence of said electromagnet, a contact moving with said vibratory body, a second contact coöperating therewith, a rocking lever carrying said second contact, an arm on said lever terminating at one end in an arc struck from the pivotal axis of the lever, a braking disk having a spindle resting on said arc, a pivoted clamp supporting said braking disk and an exciter arranged in the circuit and acting on the rocking lever to produce pulsations therein, for the purpose described.

2. In an electric circuit, an electromagnet energized by said circuit, a vibratory body subjected to the influence of said electromagnet, a contact moving with said vibratory body, a second contact coöperating therewith, a rocking lever carrying said second contact, an arm on said lever terminating at one end in an arc struck from the pivotal axis of the lever, a braking disk having a spindle resting on said arc, in series in the said circuit, said exciter comprising two or more windings having a common soft iron core, the resistance of one winding being sufficient to produce a pianissimo effect upon said vibratory body when said winding is introduced into the circuit, and the number of its windings being so predetermined that its effect on the rocking lever is the same irrespective of the effect on the vibratory body, a circuit interrupter for each electromagnet, and manually controlled means for operating said switch.

3. In an electric circuit, an electromagnet energized by said circuit, a vibratory body subjected to the influence of said electromagnet, a contact moving with said vibratory body, a second contact coöperating therewith, a rocking lever carrying said second contact, an arm on said lever terminating at one end in an arc struck from the pivotal axis of the lever, a braking disk having a spindle resting on said arc, a rheostat in the circuit to vary the intensity of the current in the electromagnet, a branch circuit for the exciter energized upon the separation of the coöperating contacts and a fixed resistance.

4. In an electric circuit, an electromagnet energized by said circuit, a vibratory body subjected to the influence of said electromagnet, a contact moving with said vibratory body, a second contact coöperating therewith, a rocking lever carrying said second contact, an arm on said lever terminating at one end in an arc struck from the pivotal axis of the lever, a braking disk having a spindle resting on said arc, a pivoted clamp supporting said braking disk and an exciter arranged in the circuit and acting on the rocking lever to produce pulsations therein, said exciter having a winding of greater resistance than that of the main electromagnet and tending to move said contacts into engagement, together with a spring tending to separate said contacts.

In testimony whereof we have signed our names to this specification.

ALCIDE HECTOR MAÎTRE.
VICTOR HENRI GASTON MARTIN.

Witnesses:
EUGENE LEGRIS,
FERNAND GUIAUTH.
HIPPOLYTE HELLÉ,
LUCIEN MEMMINGER.

Copies of this patent may be obtained for five cents each, by addressing the "Commissioner of Patents, Washington, D. C."